(12) United States Patent
Bamberger et al.

(10) Patent No.: US 6,980,376 B2
(45) Date of Patent: Dec. 27, 2005

(54) IRIS DIAPHRAGM DEVICE

(75) Inventors: Stefan Bamberger, Wetzlar (DE); Albrecht Weiss, Linden (DE)

(73) Assignee: Leica Microsystems Wetzlar GmbH, Wetzler (DE)

( * ) Notice: Subject to any disclaimer, the term of this patent is extended or adjusted under 35 U.S.C. 154(b) by 96 days.

(21) Appl. No.: 10/791,404

(22) Filed: Mar. 2, 2004

(65) Prior Publication Data

US 2004/0174616 A1   Sep. 9, 2004

(30) Foreign Application Priority Data

Mar. 3, 2003   (DE) ................ 103 09 340

(51) Int. Cl.⁷ .................... G02B 9/08; G02B 21/06
(52) U.S. Cl. ................ 359/738; 359/385; 359/739
(58) Field of Search ................ 359/738, 739, 359/740, 385

(56) References Cited

U.S. PATENT DOCUMENTS

| 3,282,182 A | 11/1966 | Rentschler ........... 95/11.5 |
| 3,668,995 A | 6/1972 | Bardutzky ........... 95/64 R |
| 3,836,234 A | 9/1974 | Farnsworth ........... 350/266 |
| 4,521,076 A * | 6/1985 | Weber et al. ........... 359/739 |

FOREIGN PATENT DOCUMENTS

| DE | 145986 | 11/1903 |
| DE | 546710 | 3/1932 |
| DE | 1815349 | 6/1970 |
| DE | 2163073 | 8/1972 |
| DE | 2324804 | 12/1973 |
| GB | 794596 | 5/1958 |

OTHER PUBLICATIONS

Wilkes-Iris Web Site "Drop-in Iris, Microscope and Lighting Accessories". "Products"; Feb. 27, 2004, http://www.wilkes-iris.com/productsmain.html.
Edmund Optics Web Site "Online Catalog". "Zero Aperture Series Iris Diaphragms"; Feb. 27, 2004; http://www.edmundoptics.com/IOD/DisplayProduct.cfm?productid=1373.

* cited by examiner

Primary Examiner—Scott J. Sugarman
(74) Attorney, Agent, or Firm—Davidson, Davidson & Kappel, LLC

(57) ABSTRACT

An iris diaphragm device for a microscope includes an iris diaphragm having a stationary mount ring, a rotatable adjusting ring, and a plurality of blades. The plurality of blades form a diaphragm opening, which is steplessly adjustable, by rotation of the adjusting ring, between a maximum and a minimum opening size. A coupling linkage is connected to the adjusting ring and includes two levers. An actuation element drives the coupling linkage. A closure element is arranged on one of the levers in a way such that after a predefined size of the diaphragm opening has been established, a further actuation of the actuation element causes the closure element to pivot and cover the diaphragm opening.

9 Claims, 2 Drawing Sheets

IRIS DIAPHRAGM DEVICE

This application claims priority to German patent application DE 103 09 340.0, the subject matter of which is hereby incorporated by reference herein.

The invention concerns an iris diaphragm device for a microscope, having an iris diaphragm that has a stationary mount ring, a rotatable adjusting ring, and a number of blades in a single diaphragm plane, so that by rotation of the adjusting ring, a diaphragm opening left open by the blades is adjustable steplessly between a maximum opening and a minimum opening.

BACKGROUND

Iris diaphragm devices of the kind cited above serve to regulate the beam cross section in optical instruments, for example in microscopes. The arrangement of the blades is implemented so that their one end is in each case rotatably supported on the annular mount, and their other end is in each case attached to the adjusting ring. As a result, the blades can be introduced as desired into the beam path by rotation of the adjusting ring, a central opening always remaining open. That central opening is steplessly adjustable between a maximum opening and a minimum opening.

These iris diaphragms known from the existing art thus cannot be completely closed, so that a residual portion of the beam cross section can always pass through. Other iris diaphragm devices having large iris diaphragms (e.g. of the Wilkes Iris company, see e.g. the Internet page www.wilkes-iris.com), in which a known iris diaphragm is combined with an additional specially shaped blade, are known for applications outside microscopy. Once the minimum opening of the iris diaphragm is reached, this specially shaped blade, constituting a spring-return diaphragm, is brought in front of the minimum opening by further actuation of the operating lever with the application of additional force.

Another iris diaphragm device (e.g. of the Wilkes-Iris company or the Edmund Optics company, see e.g. Internet page www.edmundoptics.com) has, in a very special design, two blade packets lying one behind another at a distance of a few millimeters. Because the minimum openings of the two blade packets are located at an offset behind one another, it is thereby possible to achieve complete closure of this special iris diaphragm device. Although in this fashion light of the beam cross section no longer passes through the iris diaphragm device, a defined diaphragm plane does not exist in this case because of the two blade packets in different planes. This proves, however, to be extremely unsuitable for microscopy, in which a single defined diaphragm plane is necessary.

SUMMARY OF THE INVENTION

It is therefore an object of the present invention to provide an iris diaphragm device that can be completely closed and that simultaneously exhibits a single defined diaphragm plane for applications in microscopy. At the same time, the new iris diaphragm device is intended to require little installation space and to be inexpensive.

The present invention provides an iris diaphragm device for a microscope comprising:
  an iris diaphragm that has a stationary mount ring, a rotatable adjusting ring, and a number of blades,
  a diaphragm opening being left open by the blades and being steplessly adjustable, by rotation of the adjusting ring, between a maximum opening and a minimum opening,
  a coupling linkage, having at least two levers and driven by means of an actuation element, said coupling linkage being arranged on said adjusting ring; and
  a closure element being arranged on one of said levers in such a predefined position that after a specific size of said diaphragm opening has been set, upon further actuation of said actuation element it pivots in front of said diaphragm opening and covers it.

The iris diaphragm device according to the present invention has the advantage that because of the use of very flat levers, the total installation depth and thus the space requirement for the iris diaphragm device is very small. In addition, a single defined diaphragm plane, namely in the diaphragm opening left open by the blades, is retained. The iris diaphragm device according to the present invention is thus ideal for use in a microscope, since an exact position of the diaphragm plane in the imaging beam path is provided.

The conformation and position of the closure element on one of the levers is selected in such a way that when a specific diaphragm opening size is reached, the closure element pivots in front of that diaphragm opening and covers it. In a particularly advantageous embodiment, the closure element pivots in front of the diaphragm opening and covers it only after the minimum opening has been set. In order to pivot the closure element in, the actuation element is therefore rotated further so that the closure element pivots in front of the diaphragm opening, while simultaneously the diaphragm opening located behind it (and now concealed) is already reopened somewhat wider than the minimum opening itself. The width of the closure element is thus selected appropriately to cover that diaphragm opening. The iris diaphragm device thus permits stepless adjustment of the diaphragm opening between the maximum opening and the minimum opening, and closure of the diaphragm opening after the minimum opening is reached.

A further advantage of the iris diaphragm device according to the present invention is that only a single actuation element is required in order to set the desired diaphragm opening and to close off the diaphragm opening, whereas those iris diaphragm devices known from the existing art must be actuated using two or more actuation elements. The actuation element can be, for example, a drive wheel driven manually or in motorized fashion. A linearly displaceable operating element, such as a push bar or the like, can likewise be provided, its linear motion being transferred to the rotatable actuation element, for example a drive wheel, which in turn drives the coupling linkage. In another embodiment of the iris diaphragm device the actuation element can be embodied as an electric motor, for example a stepping motor.

The use of a coupling linkage yields a further advantage for the iris diaphragm device according to the present invention. In iris diaphragm devices hitherto known, the diaphragm opening changes in linear fashion with the adjustment angle of the rotatable adjusting ring. For example, if the actuation element is designed as a stepping motor, and the iris diaphragm device is driven by means of a pinion on the motor shaft of the stepping motor and a gear, engaging into the pinion, on the outer side of the rotatable adjusting ring, then in the previously known iris diaphragm devices with linear displacement, the diaphragm opening changes by the same amount with each step of the stepping motor. If the microscope user then wishes to decrease the diaphragm opening by a given proportion, for example 10%, proceeding from the maximum diaphragm opening, this requires a corresponding number of stepping motor steps. If the diaphragm is already set to a very small value just greater than the minimum diaphragm opening, however, then a decrease in this already very small diaphragm opening, once again by the aforesaid 10%, requires substantially fewer steps, or the motor's resolution is not sufficient to effect correspondingly small changes in the diaphragm opening. The consequence of this is that for operation with small diaphragm openings and for exact setting of changes at small diaphragm openings, a stepping motor having distinctly greater resolution must be used. That stepping motor is, however, distinctly more expensive and requires a correspondingly more expensive control system. What is therefore desirable in an iris diaphragm device is not a linear dependence of diaphragm opening on motor angle (or motor steps), but rather a logarithmic dependence. In an embodiment of the iris diaphragm device according to the present invention, this criterion is met by the fact that as a result of a special configuration of the coupling linkage, the change in the diaphragm opening as a function of the rotation angle of the actuation element is accomplished approximately logarithmically. As a result, when a stepping motor is used as the actuation element, the relative change in diaphragm opening is constant from one motor step to another. At small diaphragm openings, this permits very precise changes in those diaphragm openings with each individual motor step, a constant adjusting speed being at the same time provided.

This is a considerable advantage over iris diaphragm devices known from the existing art, in which controlled changes in small diaphragm openings require a high reduction ratio in the gear/pinion drive; that, however, has a negative effect on speed for the entire adjustment range. The iris diaphragm device according to the present invention therefore offers the advantage of a rapid and precise change in diaphragm opening for the entire adjustment range, i.e. between the maximum opening and minimum opening. By appropriate design of the two levers of the coupling linkage, an embodiment of the iris diaphragm device is obtained in which the change in diaphragm opening as a function of the rotation angle of the actuation element is accomplished approximately logarithmically, especially at small diaphragm openings. This embodiment is advantageous because the logarithmic dependence of diaphragm opening on adjustment angle is most advantageously evident specifically for small diaphragm openings and their relative changes.

In order to prevent overrotation or jamming of the coupling linkage, it proves to be advantageous if the rotation range of the actuation element is limited. That limitation is preferably established so as to allow the coupling linkage to be set from the maximum opening of the iris diaphragm to the pivoting of the closure element in front of the diaphragm opening.

BRIEF DESCRIPTION OF THE DRAWINGS

The invention will be described in more detail below with reference to the schematic drawings.

DETAILED DESCRIPTION OF THE INVENTION

Figure 1A:
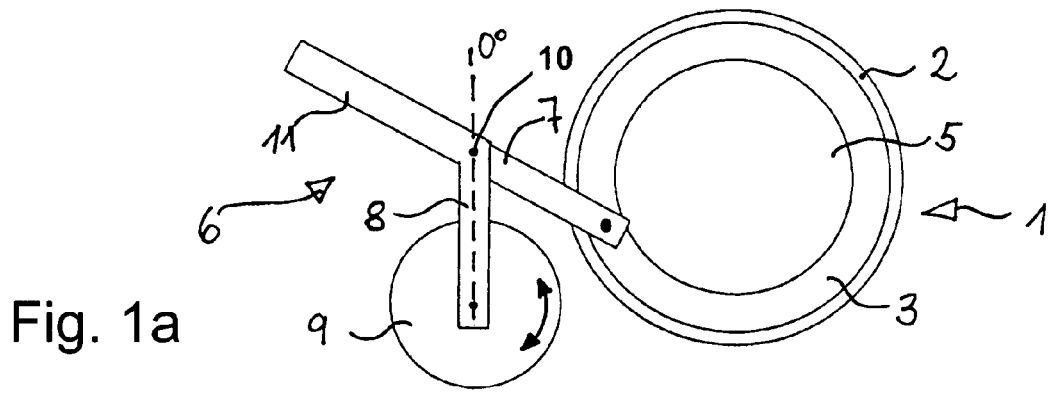
FIG. 1a shows an iris diaphragm device with a maximum diaphragm opening.

FIG. 1a shows an iris diaphragm device having an iris diaphragm 1. The latter has a stationary mount ring 2, a rotatable adjusting ring 3, and a number of blades 4 (concealed in the illustration). At the center of iris diaphragm 1, blades 4 leave open a diaphragm opening 5 that is steplessly adjustable between a maximum opening and a minimum opening. In the setting of the iris diaphragm device depicted here, actuation element 9 is in a position defined as the zero-degree position. A corresponding zero-degree axis through the rotation axis of actuation element 9 is shown in the Figure. In the position of coupling linkage 6 thus defined, diaphragm opening 5 corresponds to the maximum opening. Blades 4 are therefore concealed by adjusting ring 3 in this Figure.

In order to effect adjustment of diaphragm opening 5, a coupling linkage 6 engages on iris diaphragm 1. Coupling linkage 6 has at least two levers, of which one is mounted rotatably on rotatable adjusting ring 3 and of which a further lever is fixedly joined to an actuation element. In the embodiment of coupling linkage 6 depicted here, the latter has a first lever 7 and a second lever 8. First lever 7 is rotatably mounted at its one end on rotatable adjusting ring 3. Second lever 8 is fixedly joined at its one end to an actuation element 9, here e.g. a stepping motor. At their free ends, first lever 7 and second lever 8 are coupled to one another by means of a common movable rotary shaft 10. Arranged on second lever 8 is a closure element 11 which, as a result of the rigid connection between closure element 11 and second lever 8, follows the rotary motion of second lever 8. In the present configuration of the iris diaphragm device, first lever 8 and closure element 11 are embodied integrally. Alternatively, they can comprise two separate components and can be rigidly connected.

Figure 1B:
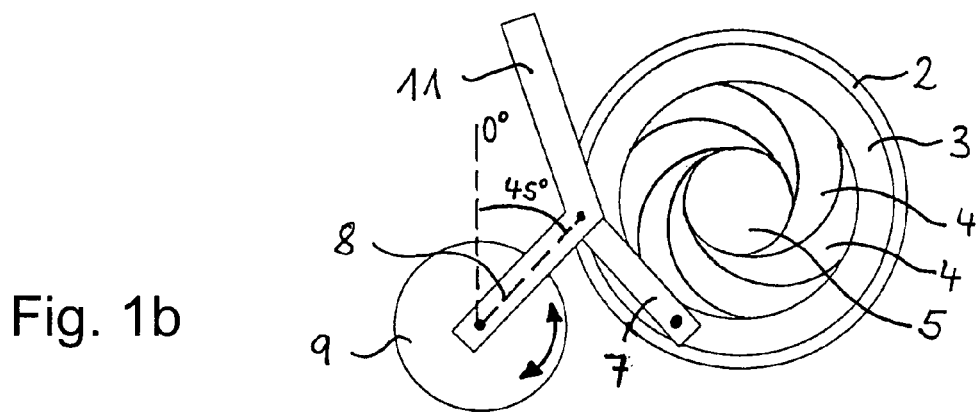
FIG. 1b shows an iris diaphragm device with an intermediate diaphragm opening.

FIG. 1b depicts the same iris diaphragm device with an intermediate setting of diaphragm opening 5. Blades 4, which leave open at the center of the iris diaphragm only a portion of the total maximum possible diaphragm opening 5, are clearly visible in this setting of iris diaphragm 1. In this position, actuation element 9 has rotated second lever 8 approximately 45 degrees. As a result, first lever 7 has further rotated rotatable adjusting ring 3 sufficiently that blades 4 have limited the beam cross section and left open only an intermediate diaphragm opening 5.

Figure 1C:
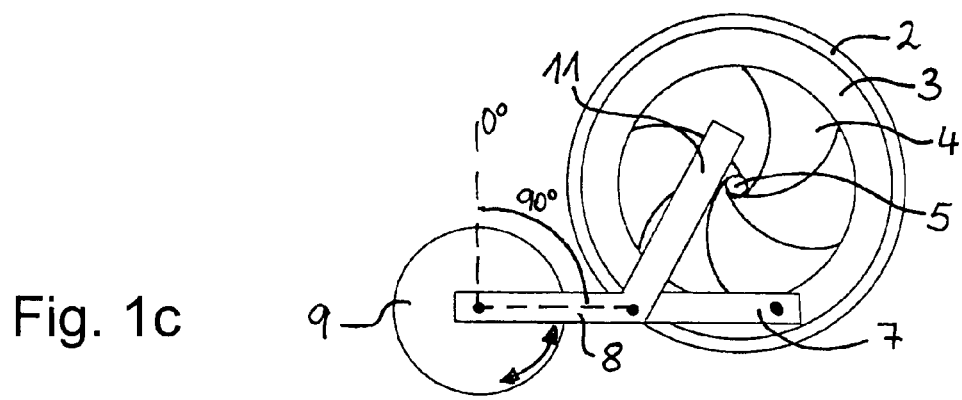
FIG. 1c shows an iris diaphragm device with a minimum diaphragm opening.

FIG. 1c shows the iris diaphragm device in a setting in which only the minimum opening of diaphragm opening 5 is left open. For that purpose, actuation element 9 has rotated second lever 8 a total of 90 degrees with respect to the zero-degree position. First lever 7 has correspondingly rotated rotatable adjusting ring 3 sufficiently that blades 4 have been introduced even farther into the beam path, leaving open only a minimum opening of diaphragm opening 5. Closure element 11 has simultaneously been moved along by the rotation of second lever 8. As is evident from the Figure, closure element 11 now lies directly next to the diaphragm opening in the minimum opening position.

Figure 1D:
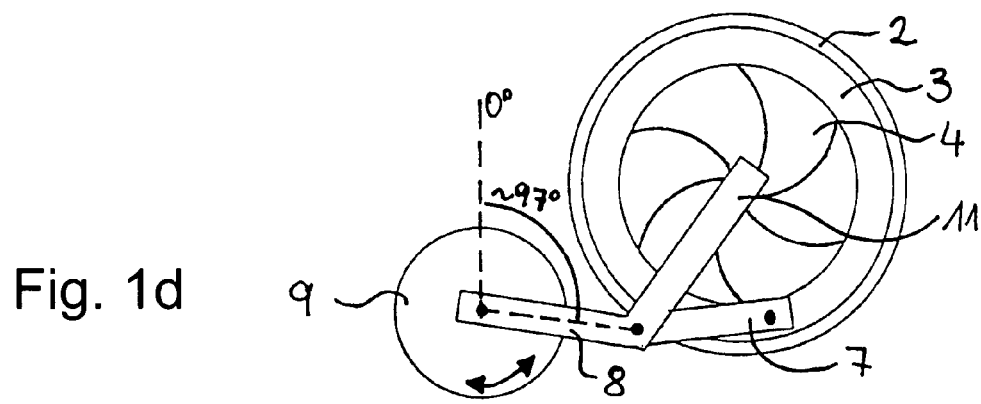
FIG. 1d shows an iris diaphragm device with a diaphragm opening covered by a closure element.

In FIG. 1d, actuation element 9 has been rotated a further 7 degrees from the position in FIG. 1c, and has correspondingly moved second lever 8 and closure element 11 as well. In this position, closure element 11 covers diaphragm opening 5, which as a result of the further rotation of the actuation element is already somewhat larger than the minimum opening. This is not apparent, however, since this already somewhat enlarged diaphragm opening 5 is entirely covered by closure element 11. A complete closure of iris diaphragm 1 by means of closure element 11 is thus implemented in the setting shown in this Figure. First lever 7, second lever 8, and closure element 11 are preferably fabricated from flat material. Closure element 11 is pivoted at a very short distance in front of diaphragm opening 5, and thus ensures that the single diaphragm plane defined by blades 4 is retained for imaging in the microscope beam path. With coupling linkage 6 that is used, toward the end of the adjustment range of diaphragm opening 5 less and less change in the diameter of diaphragm opening 5 is produced for each step of the stepping motor that is used here as actuation element 9. The desired logarithmic relationship is thus achieved to a good approximation.

Figure 2:
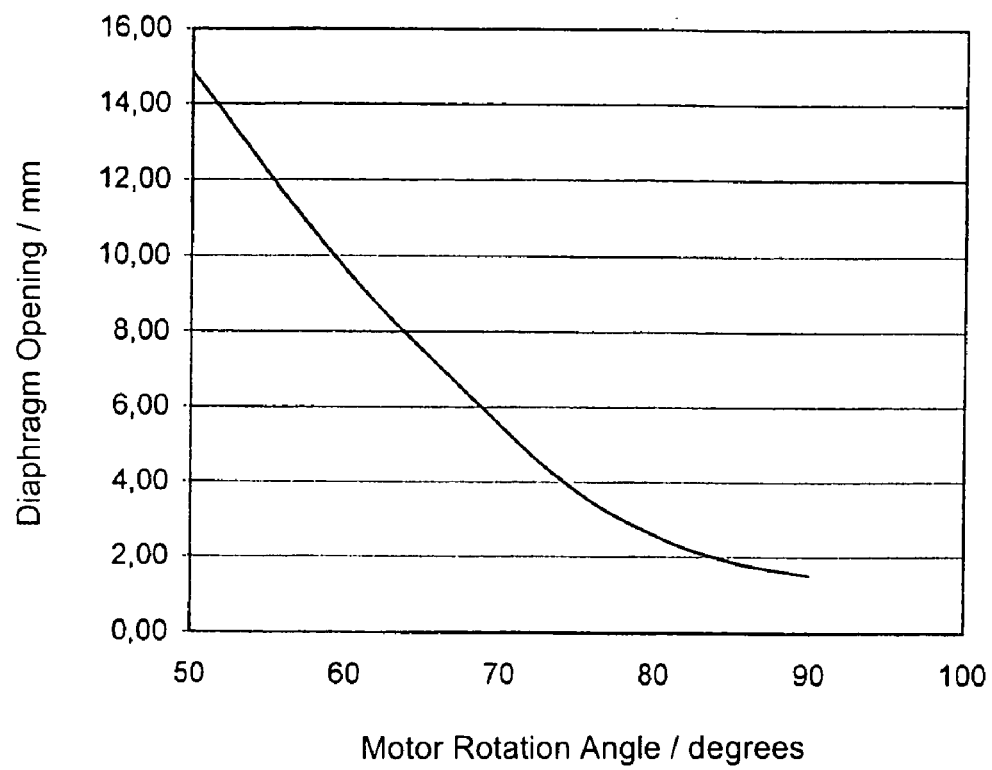
FIG. 2 shows a logarithmic correlation between the diaphragm opening and the rotation angle of the actuation element.

FIG. 2 shows, for the iris diaphragm device shown in FIGS. 1a through d, the correlation between diaphragm opening (in millimeters) and the rotation angle (in degrees) of the motor used as the actuation element, for small diaphragm openings 5. As a result of the logarithmic relationship, each motor rotation generates a large force in the rotation direction which can reliably actuate iris diaphragm 1 even in the range of the smallest diaphragm openings 5. FIG. 2 shows this logarithmic relationship for the range of small diaphragm openings. With other lengths for levers 7 and 8, the logarithmic relationship can also be extended to a wider range of diaphragm openings.

What is claimed is:

1. An iris diaphragm device for a microscope comprising:
   an iris diaphragm including a stationary mount ring, a rotatable adjusting ring, and a plurality of blades, the plurality of blades forming a diaphragm opening, the diaphragm opening being steplessly adjustable between a maximum size and a minimum size of the diaphragm opening by rotation of the adjusting ring;
   a coupling linkage connected to the adjusting ring and including at least a first and a second lever;
   an actuation element configured to drive the coupling linkage; and
   a closure element disposed on one of the first and second levers so that after a predefined size of the diaphragm opening has been established, upon a further actuation of the actuation element, the closure element pivots so as to cover the diaphragm opening.

2. The iris diaphragm device as recited in claim 1 wherein the closure element is configured to pivot in front of and cover the diaphragm opening after the minimum size of the diaphragm opening has been established.

3. The iris diaphragm device as recited in claim 1 wherein the actuation element includes a drive wheel driven in at least one of a manual and a motorized fashion.

4. The iris diaphragm device as recited in claim 1 wherein the actuation element includes an electric motor.

5. The iris diaphragm device as recited in claim 4 wherein the electric motor is a stepping motor.

6. The iris diaphragm device as recited in claim 1 wherein the coupling linkage in configured so that the diaphragm opening changes approximately logarithmically as a function of a rotation angle of the actuation element.

7. The iris diaphragm device as recited in claim 6 wherein the coupling linkage in configured so that the size of the diaphragm opening changes approximately logarithmically as a function of a rotation angle of the actuation element at small sizes of the diaphragm opening.

8. The iris diaphragm device as recited in claim 1 wherein a range of rotation of the actuation element is limited so that by adjustment of the coupling linkage all sizes of the diaphragm opening are capable of being established.

9. The iris diaphragm device as recited in claim 8 wherein the range of rotation of the actuation element is limited so that by adjustment of the coupling linkage all sizes of the diaphragm opening, from the maximum size to the pivoting of the closure element to cover the diaphragm opening, are capable of being established.

\* \* \* \* \*